United States Patent [19]

Homma

[11] Patent Number: 4,973,024
[45] Date of Patent: Nov. 27, 1990

[54] VALVE DRIVEN BY SHAPE MEMORY ALLOY

[75] Inventor: Dai Homma, Yokohama, Japan

[73] Assignee: Toki Corporation Kabushiki Kaisha, Tokyo, Japan

[21] Appl. No.: 412,436

[22] Filed: Sep. 26, 1989

[51] Int. Cl.$^5$ .............................................. F16K 31/02
[52] U.S. Cl. ........................................ 251/11; 60/528; 137/594
[58] Field of Search ............................ 137/62, 79, 594; 251/11; 60/527, 528; 236/93 R

[56] References Cited

U.S. PATENT DOCUMENTS

| | | | |
|---|---|---|---|
| 3,403,238 | 9/1968 | Buehler | 251/11 |
| 3,625,002 | 12/1971 | Davis | 251/11 |
| 3,650,505 | 3/1972 | Drexel | 251/11 |
| 4,325,217 | 4/1982 | Golestaneh | 60/527 |
| 4,674,398 | 6/1987 | Taylor | 251/11 |
| 4,736,587 | 4/1988 | Suzuki | 251/11 |
| 4,750,520 | 6/1988 | Heim et al. | 251/11 |
| 4,799,577 | 1/1989 | de Carbon | 251/11 |

FOREIGN PATENT DOCUMENTS 0121266 7/1984 Japan ..................................... 251/11

Primary Examiner—George L. Walton

[57] ABSTRACT

A valve including a wire-shaped element of shape memory alloy as its driving source. The wire-shaped element is mechanically associated with a valve element so as to undergo an elongation from its original length when the valve element is moved in a predetermined direction, which can be either a direction to open a valve port or a direction to close the valve port. A biasing device biases the valve element in the predetermined direction. When the shape memory alloy is not heated to its critical temperature, it undergoes an elongation due to the biasing device, allowing the valve element to close/open the valve port. On the other hand, when heated to its critical temperature or higher, the shape memory alloy exhibits the shape memory effect contracting to its original length, whereupon the valve element opens/closes the valve port.

21 Claims, 5 Drawing Sheets

VALVE DRIVEN BY SHAPE MEMORY ALLOY

BACKGROUND OF THE INVENTION

The present invention relates to valves including a shape memory alloy as a driving source thereof.

Valves which are driven by a driving source other than man power, such as electromagnetic valves or solenoid-controlled valves have been commonly utilized. These electromagnetic valves, however, inevitably have such shortcomings as being big in size and heavy in weight due to their structure as including a coil, armature and stator. In addition, they have another shortcoming in that they require a high current and high voltage to operate them.

SUMMARY OF THE INVENTION

Accordingly, it is an object of the present invention to provide a valve driven by a shape memory alloy.

It is another object of the present invention to provide a valve of very small size and light weight as compared with the conventional electromagnetic valve.

It is another object of the present invention to provide a valve operable by a low current and low voltage.

In accordance with the above objects, the present invention is directed to a valve which includes a valve port and a valve element for opening and closing the valve port. A wire-shaped element shape memory alloy is mechanically associated with the valve element so as to undergo an elongation deformation when the valve element is moved in a predetermined direction, which can be either a direction to open the valve port or a direction to close the valve port. The valve element is biased by biasing means in the predetermined direction.

When the shape memory alloy is not heated to its critical temperature at which the shape memory effect occurs it undergoes an elongation deformation by the biasing force of the biasing means, thereby allowing the valve element to close/open the valve port.

On the other hand, when the shape memory alloy is heated to the critical temperature or higher, it exhibits the shape memory effect, generating a shape recovering force therein, and contracts against the face of the biasing means to the original length it remembers whereby the valve element opens/closes the valve port.

Subsequently, when the heating of the shape memory alloy is interrupted, allowing the shape memory alloy to be cooled, the shape memory alloy again undergoes an elongation by the biasing force of the biasing means, thereby allowing the valve element to close/open the valve port again.

According to the valve of the present invention, it is possible to remarkably decrease the size and weight of the valve and to operate it with a low voltage and low current, since the shape memory alloy is utilized as a driving source.

BRIEF DESCRIPTION OF THE DRAWINGS

These and other objects and features of the present invention will become more fully apparent from the following description in conjunction with the accompanying drawings.

DETAILED DESCRIPTION

Figure 1:
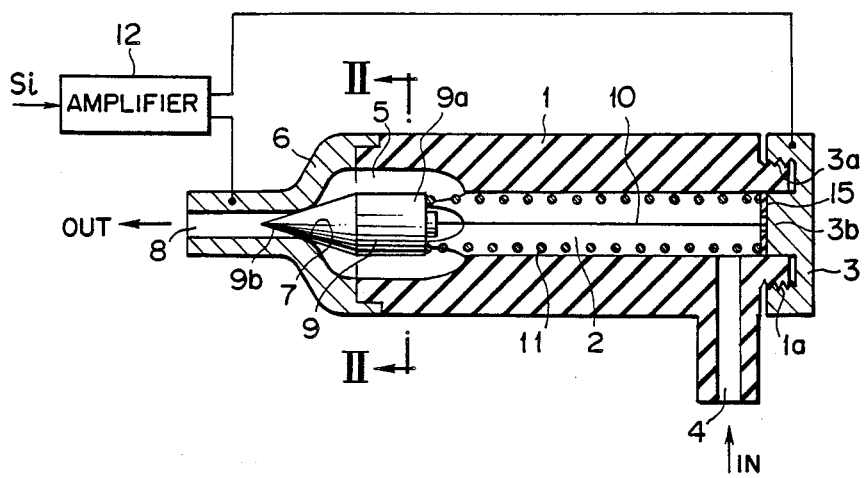
FIG. 1 is a sectional view showing a first preferred embodiment of the valve according to the present invention in its closed state with an amplifier for driving the valve.

The present invention will hereunder be described in conjunction with the preferred embodiments shown in the drawings.

FIGS. 1 to 4 show the first preferred embodiment of the valve according to the present invention. A casing 1 made of an electric insulating material has an approximately tubular shape with a longitudinal bore 2 formed therethrough and a male threaded portion 1a of smaller diameter centrally formed at one end thereof protruding longitudinally. An adjusting screw member 3, that is formed as an approximately cup shaped member with female threaded portion 3a is screwed at threaded portion 3a formed on the inner cylindrical onto the male threaded portion 1 a. A protruded portion 3b of a cylindrical shape formed on the center of the inner bottom surface of the adjusting screw member 3 is rotatably and longitudinally movably fitted into the end of the bore 2 within the male threaded portion 1a.

Figure 2:
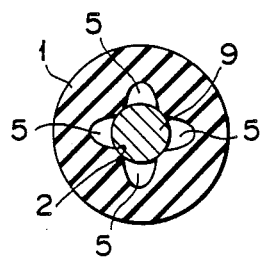
FIG. 2 is a sectional view taken along the line II—II in FIG. 1.

The casing 1 includes a valve inlet port 4, formed proximate to the male threaded portion 1a end thereof, that is communicated with the bore 2 and is to be connected to an air supply source, not shown. A suitable number of grooves 5 are formed on the inner cylindrical surface of the bore 2 at the end thereof opposite to the adjusting screw member 3, extending along the longitudinal direction of the casing 1. FIG. 2 shows cross sections of these grooved 5. Over the grooves 5 end of the casing 1, an outlet member 6 made of a good electrical conductor material such as metal is fixedly fitted. The outlet member 6 includes an outlet port 8 formed at the forward end thereof to be connected to a load, not shown, and a valve port 7 formed therein between the outlet port 8 and the bore 2. The longitudinal axis of the outlet port 8 is aligned with that of the valve port 7. The outlet member 6 also serves as a contact member, as will be discussed in detail later herein.

A valve element 9 made of a good electrical conductor material such as metal, which also serves as a contact member cooperating with the outlet member 6, consists of a cylindrical portion 9a and cone portion 9b formed coaxially with the cylindrical portion 9a at the forward end of the cylindrical portion 9a. The cylindrical portion 9a is fitted longitudinally slidably into the bore 2 within the grooved end forming gaps between the outer surface thereof and the inner surface of the bore 2 at the grooves 5 to pass the air therethrough. The cone portion 9b is to open and close the valve port 7 when the valve element 9 moves in the longitudinal or axial direction.

Figure 4:
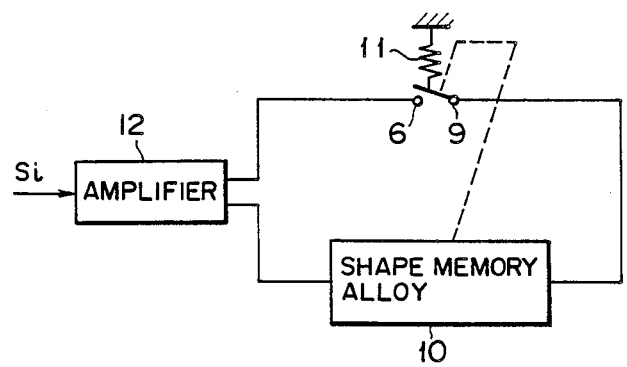
FIG. 4 is a circuit diagram showing the electrical connections in the first preferred embodiment.

A wire-shaped element of shape memory alloy 10 made of a Ti-Ni alloy is mechanically and electrically connected to the rearward end of the valve element cylindrical portion 9a at one end thereof, and the other shape memory alloy 10 end is mechanically and electrically connected to the center of the protruded portion 3b of the adjusting screw member 3 so as to be fixed with regard to the tensile direction but to be rotatable relative to the protruded portion 3b. The original length of the shape memory alloy 10, the length it remembers, is somewhat shorter than its length shown in FIG. 1. There is provided a compression coil spring 11 in the bore 1 interposed between the adjusting screw member 3 and the valve element 9, which spring 11 biases the valve element toward the valve port 7. An amplifier 12 receives a control signal $S_i$ and power amplifies it. The output of the amplifier 12 is electrically connected to the adjusting screw member 3 and the outlet member 6. FIG. 4 shows the electrical connector of this embodiment.

Operation of this preferred embodiment is substantially as follows.

When there is no output from the amplifier 12 and the shape memory alloy 10 is at ambient temperature, the force the spring 11 stretches the shape memory alloy 10 to give an elongation thereto and abuts cone portion 9b of the valve element 9 on the valve port 7 9b.

On the other hand, with the valve port 7 closed by the valve element 9, when the output of the amplifier 12 is above a certain critical level an electric current is passed from the amplifier 12 to the circuit composed of the adjusting screw member 3, the shape memory alloy 10, the valve element 9, whereupon the outlet member 6, whereupon the shape memory alloy 10 is provided with an electric power greater than a certain critical value and is heated by the Joule heat to its critical temperature or higher Then, the shape memory alloy 10 exhibits the shape memory effect, generating a shape recovering force therein, and contracts to the original length against the spring 11, whereby the valve element 9 is pulled apart from the valve port 7 to open it.

When the valve element 9 is separated from the valve port 7 as described above, the current through the shape memory alloy 10 is interrupted, thereby the shape memory alloy 10 is cooled again and receives an elongation by the force of the spring 11, thus allowing the valve element 9 to close the valve port 7 again. Then, the current passes through it again, whereby it is heated, contracts and pulls the valve element 7 away from the valve port 7. As the operations described above are repeated, the valve element 9 opens and closes the valve port 7 in repetition. While the valve port 7 is opened, air passes through the valve by way of the inlet port 4, the bore 2, the grooves 5, the valve port 7 and the outlet port 8.

Figure 5:
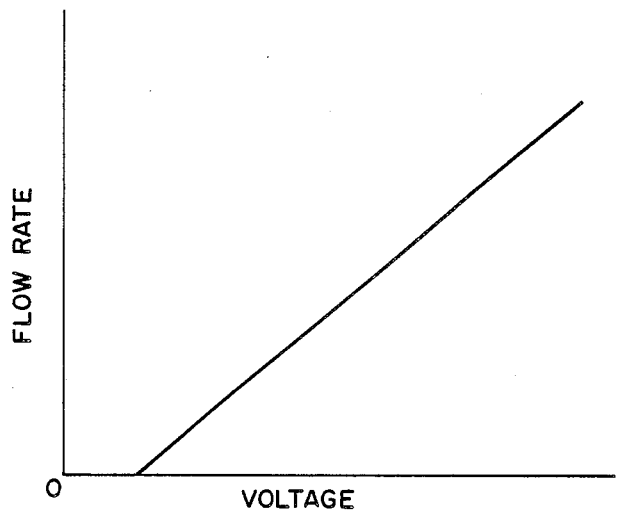
FIG. 5 is a characteristic curve diagram showing the relationship of the voltage applied to the shape memory alloy with the flow rate through the valve in the first preferred embodiment.

The greater the heat applied by electric power to the shape memory alloy within an appropriate temperature range, the greater is the recovering force of the shape memory alloy towards its original length, that is, the more it contracts. Therefore, even with the valve element 9 repeatedly opening and closing the valve port 7 as set out above, the degree of opening of the valve port 7 in average and the period during which the valve is opened, in total, increase with the electric power supplied to the shape memory alloy 10. Accordingly, when the both the pressure from the air supply source and the pressure at the side of the load are constant, the relationship between the voltage applied to the shape memory alloy 10 and the flow rate through the valve is given in FIG. 5; the flow rate increases with the voltage within a certain range. As can be seen from FIG. 5, the valve of this embodiment has an excellent linearity with regard to the relationship between the voltage and the flow rate. Since the current through the shape memory alloy 10 is in direct proportion to the voltage applied thereto, the relationship between the current and the flow rate also has an excellent linearity.

Thus, the flow rate or the pressure can be controlled by the output of the amplifier 12 or the control Signal $S_i$ in this embodiment. Of course, using this valve in an automatic control system provides more accurate control of the flow rate or the pressure.

The performance characteristic of this embodiment will be discussed in more detail hereinafter with reference to FIGS. 6 to 8.

Figure 6:
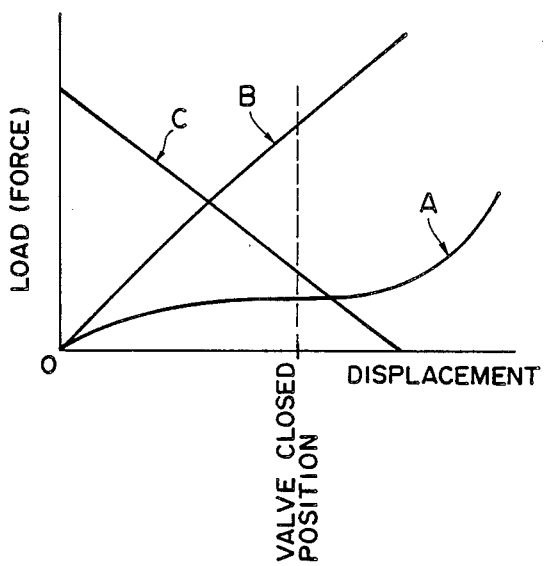
FIG. 6 is a characteristic curve diagram showing the relationships of the valve element displacement with a resisting force of the shape memory alloy when deformed at ambient temperature, with a shape recovering force of the shape memory alloy when heated and with a spring force in the first preferred embodiment.

In FIG. 6 the curve A indicates the relation between the displacement of the valve element 9, i.e. the elongation of the shape memory alloy 10, and a resisting force of the shape memory alloy 10 gives when deformed at ambient temperature, the curve B indicates the relation between the displacement of the valve element 9 and shape recovering force of the shape memory alloy 10 when heated, and the straight line C indicates the relation between the displacement of the valve element 9 and the force of the spring 11. In FIG. 6, with regard to the axis of abscissa, the origin corresponds to the location where the shape memory alloy 10 is at the original length.

Figure 7:
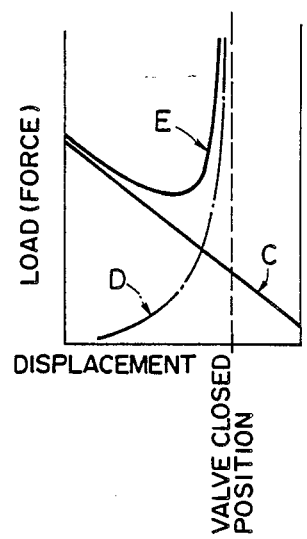
FIG. 7 is a characteristic curve diagram showing the relationships of the valve element displacement with the spring force, with a force applied to the valve element due to the pressure difference between the upstream and downstream sides of the valve element and with a resultant force composed of the spring force and the force due to the pressure difference in the first preferred embodiment.

In FIG. 7, which covers only the operating range of the valve and vicinity, the straight line C is a part of the straight line C in FIG. 6, the curve D indicates the relation between the displacement of the valve element 9 and the force acted on the valve element 9 due to the pressure difference between the upstream and downstream sides of the valve element 9, i.e. the pressure difference between the inlet port 4 and the outlet port 8, and the curve E indicates the displacement of the valve element 9 and the resultant force composed of the force of the spring 11 and the force due to the pressure difference.

Here, the resultant force, the force of the curve E, acts on the valve element 9 to close the valve port 7 and also serves as a biasing force applied to the shape memory alloy 10. When the shape memory alloy 10 is at ambient temperature, the resisting force against the deformation of the shape memory alloy 10, the force of the curve (FIG. 6) opposes the resultant force. On the other hand, when the shape memory alloy 10 is heated to its critical temperature or higher, the shape recovering force of the shape memory alloy 10, the force of the curve B, acts on the valve element 9 to open the valve port 7.

Figure 8:
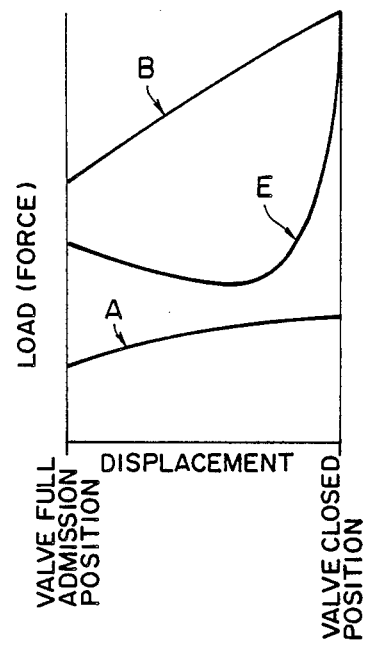
FIG. 8 is a characteristic curve diagram showing the relationships of the valve element displacement with the resisting force of the shape memory alloy at ambient temperature, with the shape recovering force of the shape memory alloy when heated and with the resultant force composed of the spring force and the force due to the pressure difference in the first preferred embodiment.

FIG. 8 shows the curves A, B and E as enlarged within the operating range of the valve. When the shape memory alloy 10 is at ambient temperature, the force difference between the curves E and A acts on the valve element 9 to close the valve port 7, while, when the shape memory alloy 10 is heated, the force difference between the curves B and E acts on the valve element 9 to open the valve port 7.

As can be seen from these figures, at the valve closed position, the deformation or compression of the spring 11 becomes smaller and thereby the force of the spring 11 alone exerts weak force to close the valve. In this valve, however, in addition to the spring force, the force due to the pressure difference between valve element 9 acts valve element 9 to close the valve port 7. This pressure difference force becomes largest at the valve closed position, so that, a strong force for closing the valve is available.

On the other hand, the shape recovering force of the shape memory alloy 10 is largest at the valve closed position since the elongation of the shape memory alloy 10 is largest thereat. Therefore, when heated, the shape memory alloy 10 can open the valve which is exposed to the strong closing force as described above.

In this embodiment, by rotating the adjusting screw member 3, the relation between the displacement of the valve element 9 and the elongation of the shape memory alloy 10 as well as the shape recovering force can be adjusted.

Further, in this embodiment, since the shape memory alloy 10 is cooled by the air flow through the valve, the cooling rate of, the shape, memory alloy 10 becomes higher, improving the response of the valve.

Also, this valve is operable with a low voltage such as less than one (1) volt and low current, since the shape memory alloy is utilized as a driving source.

The shape memory alloy 10 can be actuated by an alternating current, direct current or pulse current. When a pulse current is utilized, pulse modulation such as pulse width modulation can be used to control the valve operation.

Although air is the fluid to be controlled by the valve in the above embodiment, it should be understood that flow or pressure of other gases and liquids can be controlled by the valve according to the present invention within the scope of this disclosure.

Figure 9:
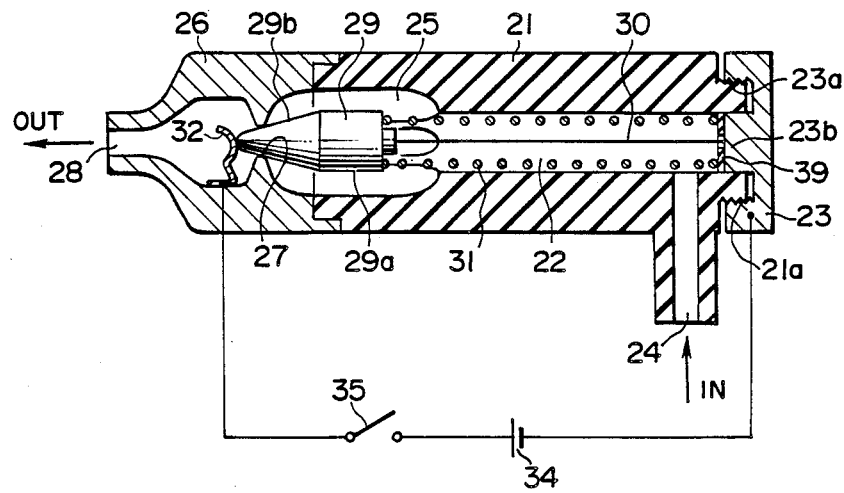
FIG. 9 is a sectional view showing a second preferred embodiment of the present invention in its closed state.
Figure 10:
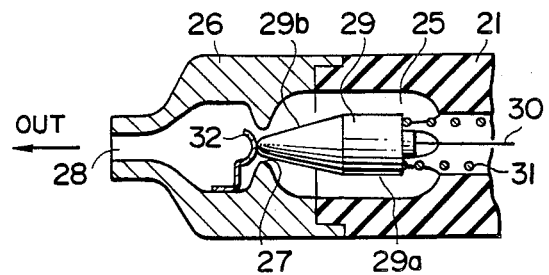
FIG. 10 is a sectional view showing a part around the valve element of the second preferred embodiment in the valve open state.

FIGS. 9 and 10 show the second preferred embodiment of the present invention wherein the valve is opened or closed in an on/off manner, unlike the first embodiment.

As similar to the previous embodiment, a casing 21 made of an electric insulating material has an approximately tubular shape with a longitudinal bore 22 formed therethrough and a male threaded portion 21a of relatively small diameter centrally formed at one end thereof protruding longitudinally. An adjusting screw member 23, that is formed as an approximately cup shaped member with female threaded portion 23a, is screwed onto the male threaded portion 21a. A protruded portion 23b of a cylindrical shape formed on the center of the inner bottom surface of the adjusting screw member 23 is rotatably and longitudinally movably fitted into the end of the bore 22 within the male threaded portion 21a.

The casing 21 includes a valve inlet port 24, formed proximate to the male threaded portion 21a thereof, that is communicated with the bore 22 and is to be connected to an air supply source, not shown. A suitable number of grooves 25, similar to the grooves 5 of the first embodiment, are formed on the inner cylindrical surface of the bore 22 at the end thereof opposite to the adjusting screw member 23, extending along the longitudinal direction of the casing 21. Over the grooved end of the casing 21, an outlet member 26 made of a good electrical material such as metal is fixedly fitted. Outlet member 26 includes an outlet port 28 formed at the forward end thereof to be connected to a load, not shown, and a valve port 27 formed therein between the outlet port 28 and the bore 22. The outlet member 26 also serves as a contact member, as will be discussed in detail later herein.

A valve element 29 made of a good electrical conductor material such as metal, which also serves as a contact member cooperating with the outlet member 26, consists of a cylindrical portion 29a and a cone portion 29b with a rounded top end, formed coaxially with the cylindrical portion 29a at the forward end of the cylindrical portion 29a. The cylindrical portion 29a is fitted longitudinally slidably into the bore 22 at the portion where grooves 25 are formed. The cone portion 29 serves to open and close the valve port 27 when the valve element 29 moves in the longitudinal or axial direction, A wire-shaped element of shape memory alloy 30 made of a Ti-Ni alloy is mechanically and electrically connected at one end thereof to the rearward end of the valve element cylindrical portion 29a, and the other shape memory alloy 30 end is mechanically and electrically connected to the center of the protruded portion 23b of the adjusting screw member 23 so as to be fixed with regard to the tensile direction but to be rotatable relative to the protruded portion 23b. The original length of the shape memory alloy 30, the length it remembers, is somewhat shorter than its length shown in FIG. 9. There is provided a compression coil spring 31 in the bore 21 interposed between the adjusting screw member 23 and the valve element 29, which spring 31 biases the valve element 29 toward the valve port 27. Between the end of the spring 31 and the protruded portion 23b of the adjusting screw member 23, a washer 39 made of an electric insulating material is interposed.

A leaf spring contact member 32 is fixed within the outlet member 26 at one end thereof. Contact member 32, through its resilience, makes contact with the valve element 29 while the valve element 29 is located between a valve closed first position where it is in close contact with the valve port 27 as shown in FIG. 9 and a full admission or full open second position where it substantially fully opens the valve port 27, as shown in FIG. 10. The contact member 32 is separated from the valve element 29 when the valve element is moved beyond the full admission position away from the valve port 27 to a third position. The adjusting screw member 23 is electrically connected to one electric pole of a power source 34, and the other electric pole of the power source 34 is electrically connected to the contact member 32 via a switch 35. Although the power source 34 is shown as a battery in FIG. 9, this is not intended to be limitative of the present invention, and the power source could alternatively be a DC power source of another type, AC power source or pulse source.

Operation of this embodiment is substantially as follows.

When the switch 35 is opened and the shape memory alloy 30 is at ambient temperature, there is no current through the shape memory alloy 30 and the valve element 29 is in close contact with the valve port 27 to close it by means of the spring 3, forced and the pressure difference between the upstream and downstream sides of the valve element 29.

In this state, when the switch 35 is closed, a current is passed from the power source 34 to the circuit composed of the switch 35, the contact member 32, the valve element 29, the shape memory alloy 30 and the adjusting screw member 23, whereby the shape memory alloy 30 is heated and tends to revert to its original length, contracting against the spring 31 force and the pressure difference, and thereby causing the valve element 29 to separate from the valve port 27 to open it. When the valve element 29 is moved beyond the full admission position away from the valve port 27, it is separated from the contact member 32, causing the current through the shape memory alloy 30 to be interrupted. Then, the shape memory alloy 30 is cooled and undergoes a small elongation by the force of the spring 31, thereby allowing the valve element 29 to come in contact with the contact member 32 at the full admission position. This causes the current to flow through the shape memory alloy 30 again, whereby the shape memory alloy 30 is heated, contracts and pulls the valve element 29 away from the contact member 32.

As the operations described above are repeated, the valve element 29 repeatedly contacts and separates from the contact member 32 leaving the valve port 27 continuously opened in the full admission state, while the switch 35 is closed.

When the switch 35 is opened again, the current supply to the shape memory alloy 30 is continuously interrupted, whereby the shape memory alloy 30 is cooled to a great extent and receives a large elongation due to the the spring 31 force and the pressure difference, allowing the valve port 27 to be closed by the valve element 29.

Thus, in this embodiment, unlike the first embodiment, the valve is opened and closed in an on/off manner, that is, the valve is continuously fully opened when the switch 35 is closed, while it is continuously closed when the switch 35 is opened.

In this embodiment, as set out above, with the valve port 27 substantially fully opened by the valve element 29, the valve element 29 and the contact member 32 contact and separate with and from each other in repetition, whereby the current supply to the shape memory alloy is not performed continuously but intermittently, and, therefore, overheating of the shape memory alloy 30 is prevented. However, if there is no fear of overheating the shape memory alloy with continuous current supply thereto, the valve element 29 can be continuously contacted with the contact member 32 regardless of its position with respect to the longitudinal direction of the bore 22.

Figure 11:
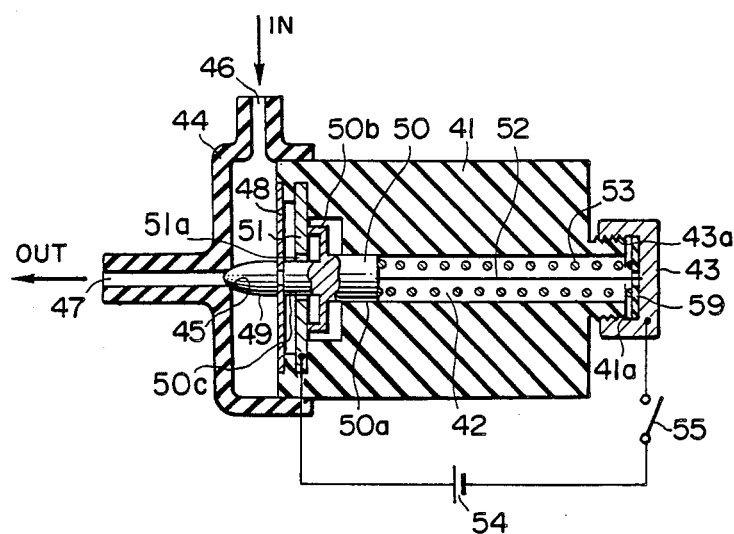
FIG. 11 is a sectional view showing a third preferred embodiment of the present invention.

FIG. 11 shows the third preferred embodiment of the present invention In the previous embodiments, there arises a problem in case the fluid passing through the valve is combustible, since the fluid contacts with the contact members and the shape memory alloy. However, this third embodiment shown in FIG. 11 is as an explosion proof type which is suitable for handling a combustible fluid.

A casing 41 made of an electric insulating material has an approximately tubular shape with a longitudinal bore 42 formed therethrough and a male threaded portion 41a of smaller diameter centrally formed at one end thereof protruding longitudinally. The bore 42 is enlarged to have a few steps at the end thereof opposite to the male thread portion 41a. An adjusting screw member 43, that is formed as a substantially cup shaped member with female threaded portion 43a, is screwed onto the male threaded portion 41a.

Fixedly fitted over the end of the casing 41 opposite to the male threaded portion 41a is a port member 44 that includes an inlet port 46 extending at a right angle to the longitudinal axis of the casing 41, an outlet port 47 formed in alignment with the longitudinal axis of the casing 41, and a valve port 45 formed therein to be situated between the outlet port 47 and the bore 42. A space formed within the port member 44 is separated from the bore 42 by a diaphragm 48 mounted on the end of the casing 41. Within the bore 42 a second contact member 51 of a disk shape, made of a good electrical conductor material and with a central hole 51a formed therethrough, is mounted parallel and adjacent to the diaphragm 48. A valve element 49 made of an electrical insulating material is fixed at the center of the diaphragm 48, extending toward the valve port 45 for opening and closing it. A first contact member 50 made of a good electrical conductor material is fixed to the the rearward end of the valve element 49. The first contact member 50 includes a first cylindrical portion 50a fitted longitudinally slidably into the smaller diameter portion of the bore 42, a second cylindrical portion 50c passing through the central hole 51a of the second contact member, and a flange portion 50b shaped like a saucer that is formed between the first and second cylindrical portions 50a and 50c. The flange portion 50b has good resilience, and is to be in contact with the second contact member 51 while the valve element 49 is located between a valve closed position where it is in close contact with the valve port 45 as shown in FIG. 11 and a full admission or full open position where it substantially fully opens valve port 45. The flange portion 50b is separated from the first contact member 51 when the valve element 49. is moved beyond the full admission position away from the valve port 45.

A wire-shaped element of shape memory alloy 52 made of a Ti-Ni alloy is mechanically and electrically connected at one end thereof to the valve element 49 via the first contact member 50, and the other shape memory alloy 52 end is mechanically and electrically connected to the center of the adjusting screw member 43 so as to be fixed with regard to the tensile direction but to be rotatable relative to the adjusting screw member 43. The original length of the shape memory alloy 52, the length it remembers, is somewhat shorter than its length shown in FIG. 11. There is provided a compression coil spring 53 in the bore 42 interposed between the adjusting screw member 43 and the first contact member 50, which spring 53 biases the valve element 49 via the first contact member 50 toward the valve port 45. Between the end of the spring 53 and the inner bottom surface of the adjusting screw member 43, a washer 59 made of an electrical insulating material is interposed.

The second contact member 51 is electrically connected to one electric pole of a power source 54 and the other electric pole of the power source 54, in turn, is electrically connected to the adjusting screw member 43 via a switch 55.

Operation of this embodiment is substantially as follows.

When the switch 55 is opened and the shape memory alloy 52 is at ambient temperature, there is no current through the shape memory alloy 52 and the force of the spring 53 presses the valve element 49 into close contact with the valve port 45 to close it and cause elongation of the shape memory alloy 52.

On the other hand, when, from the above state, the switch 54 is closed, a current is passed from the power source 54 to the circuit composed of the second contact member 51, the first contact member 50, the shape memory alloy 52, the adjusting screw member 43 and the switch 55, whereby the shape memory alloy 52 is heated and tends to revert to its original length, contracting against the force of the spring 53, thereby causing the valve element 49 to separate from the valve port 45 to open it. When the valve element 49 is moved beyond the full admission position away from the valve port 45, the flange portion 50b of the first contact member is separated from the second contact member 51, causing the current through the shape memory alloy 52 to be terminated. Then, the shape memory alloy 52 is cooled and receives a small elongation by the force of the spring 53, thereby allowing the flange portion 50b of the first contact member 50 to come in contact with the second contact member 51 at the full admission position. This causes the current to flow through the shape memory alloy 52 again, whereby the shape memory alloy 52 is heated and contracts, pulling the flange portion 50b away from the second contact member 51.

As the operations described above are repeated, the second and first contact members 51 and 52 repeatedly contact and separate from each other leaving the valve port 45 continuously opened in the full admission state 49, while the switch 55 is closed.

When the switch 55 is opened again, the current supply to the shape memory alloy 52 is continuously interrupted, whereby the shape memory alloy 52 is cooled to a great extent and receives a large elongation due to the force of the spring 53, causing the valve port 45 to be closed by the valve element 49.

Thus, in this embodiment, the valve is opened and closed in an on/off manner as is the case with the second embodiment shown in FIGS. 9 and 10.

In this embodiment, the contact members 50 and 51 and the shape memory alloy 52 are separated from the fluid which enters the space within the port member 44 at the inlet port 46, passes through between the valve element 49 and the valve port 45, and then out of the valve through the outlet port 47, whereby an explosion-proof construction is attained.

If there is no fear of over heating the shape memory alloy 52 with continuous current supply thereto, the second contact member 50 can be continuously contacted with the first contact member 51 regardless of the position of the valve element 49 with respect to the longitudinal direction of the bore 42.

Figure 3:
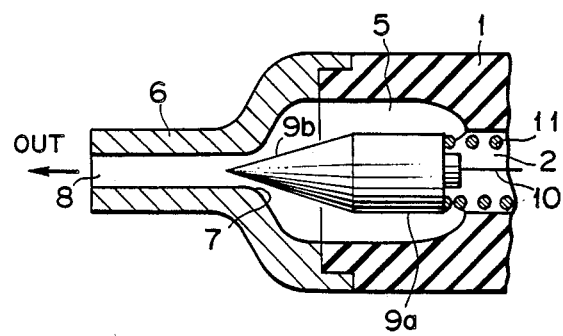
FIG. 3 is an enlarged sectional view showing a part around the valve element of the first preferred embodiment in the valve open state.

If the valve construction is modified such that the first contact member 50 is not endowed with resilience and the first contact member 50 is separated from the second contact member when the valve element 49 is separated from the valve port 45, an analog operation is performed as is the case with the first embodiment (FIGS. 1–3).

Although in the previous embodiments the valve is constructed such that the shape memory alloy receives an elongation when the valve element is moved in the direction to close the valve port, and the spring biases the valve element in the direction to close the valve port, this is not intended to be limitative of the present invention, and, on the contrary, the valve can be constructed such that the shape memory alloy receives an elongation when the valve element is moved in the direction to open the valve port, and the spring biases the valve element in the direction to open the valve port. So arranged, the valve is closed when the shape memory alloy is heated, while it is opened when the shape memory alloy is cooled.

Figure 12:
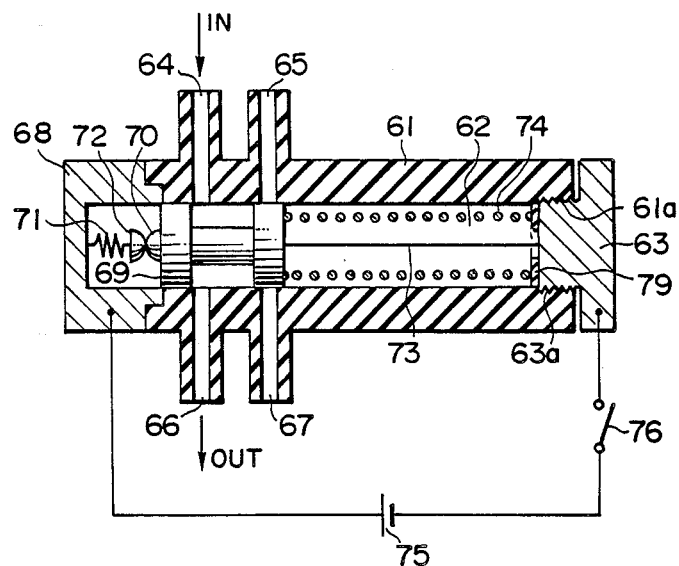
FIG. 12 is a sectional view showing a forth preferred embodiment of the present invention.
Figure 13:
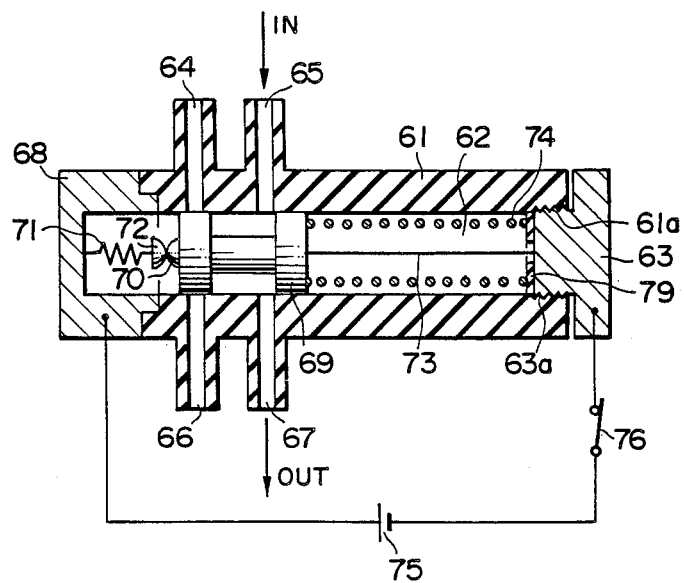
FIG. 13 is a sectional view showing the fourth preferred embodiment with a spool shifted from its position in FIG. 12.

FIGS. 12 and 13 show the fourth preferred embodiment of the present invention that is constructed as a spool type valve. A casing 61 made of an electric insulating material has an approximately tubular shape with a longitudinal bore 42 formed therethrough. The casing 62 includes a female threaded portion 61a formed on the inner cylindrical surface thereof at one end thereof, into which female threaded portion 61a, a male threaded portion 63a formed on an adjusting screw member 63 made of a good electrical conductor material is screwed. Further, the casing 62 includes first and second inlet ports 64 and 65 and first and second outlet ports 66 and 67 formed proximate to the end thereof opposite to the female threaded portion 61a, alongside each other. Each port is formed at a right angle to the longitudinal axis of the casing 61, and the first inlet port 64 is formed in alignment with the first outlet port 66 and the second inlet port 65 is formed in alignment with the second outlet port 67. A cover 68 made of a good electrical conductor material is fixedly fitted into the end of the casing 61 at the side of the ports 64 to 67 to close the opening of the 62. A spool or valve element 69 made of a good electrical conductor material is fitted longitudinally slidably into the bore 62.

A first contact member 70 approximately of a semisphere shape made of a good electrical conductor material is fixed to the end face of the spool 69 at the side of the cover member 68. A compression coil spring 71 made of a good electrical conductor material is connected to the inner end face of the cover member 68 at one end thereof. Mounted on the other end of spring 71 is a second contact member 72 of approximately a semisphere shape made of a good electrical conductor material, which is, by means of the resilience of the spring 71, to be kept in contact with the first contact member 70 while the spool 69 is located between the position in FIG. 12 where it opens the first inlet and outlet ports 64 and 66 and closes the second inlet and outlet ports 65 and 67 and the position in FIG. 13 where it closes the first inlet and outlet ports 64 and 66 and opens the second inlet and outlet ports 65 and 67, and which is separated from the first contact member 70 when the spool 69 is moved beyond the position in FIG. 13 away from the cover member 68.

A wire-shaped element of shape memory alloy 73 made of a Ti-Ni alloy is mechanically and electrically connected at one end thereof to the end face of the spool 69 at the of the adjusting screw member 63, and the other end of the shape memory alloy 73 is mechanically and electrically connected to the center of the inner end face of the adjusting screw member 63 so as to be fixed with regard to the tensile direction but to be rotatable relative to the adjusting screw member 63. The original length of the shape memory alloy 73, the length it remembers, is somewhat shorter than its length shown in FIG. 12. There is provided a compression coil spring 74 in the bore 62 interposed between the adjusting screw member 63 and the spool 69, which spring 74 biases the spool 69 toward the position in FIG. 12. Between the end of the spring 74 and the inner end face of the adjusting screw member 63, a washer 79 made of an electrical insulating material is interposed.

The cover member 68 is electrically connected to one 35 electric pole of a power source 75, and the other electric pole of the power source 75, in turn, is electrically connected to the adjusting screw member 63 via a switch 76.

Operation of this embodiment is substantially as follows.

When the switch 76 is opened and the shape memory alloy 73 is at ambient temperature, there is no current through the shape memory alloy 73 and the force of the spring 74 gives an elongation to the shape memory alloy 73 and locates the spool 69 at the position in FIG. 12 where it opens the first inlet and outlet ports 64 and 66 and closes the second inlet and outlet ports 65 and 67. In this state, when the switch 76 is closed, a current is passed from the power source 75 to the circuit composed of the cover member 68, the spring 71, the second contact member 72, the first contact member 70, the spool 69, the shape memory alloy 73, the adjusting screw member 63 and the switch 76, whereby the shape memory alloy 73 is heated and tends to revert to the original length contracting against the force of the spring 74, thereby cause the spool 69 to shift to the position in FIG. 13. In this position the spool 69 closes the first inlet and outlet ports 64 and 66 and opens the second inlet and outlet ports 65 and 67.

When the spool 69 is moved beyond the position in FIG. 13 away from the cover member 68, the first contact member 70 is separated from the second contact member 72, causing the current through the shape memory alloy 73 to be interrupted. Then, the shape memory alloy 73 is cooled and receives a small elongation by the force of the spring 74, thereby allowing the first contact member 70 to come in contact with the second contact member 72 at the position in FIG. 13. This causes the current to pass through the shape memory alloy 73 again, whereby the shape memory alloy 73 is heated and contracts, pulling the spool 69.

As the operations described above are repeated, the first and second contact members 70 and 72 repeatedly contact and separate from each other leaving the first inlet and outlet ports 64 and 66 continuously closed and the second inlet and outlet ports 65 and 67 continuously opened, while the switch 76 is closed. Of course, if there is no fear of over heating the shape memory alloy 73 with continuous current supply thereto, the first and second contact members 70 and 72 can be continuously contacted with each other regardless of the position of the spool 69 with respect to the longitudinal direction of the bore 62.

When the switch 76 is opened again, the current supply to the shape memory alloy 73 is continuously interrupted, whereby the shape memory alloy 73 is cooled to a great extent and receives a large elongation due to the force of the spring 53, allowing the spool 69 to be shifted to the position in FIG. 12.

Although in the embodiments shown herein the shape memory alloys are heated by an electric current, in the present invention the shape memory alloy can be heated by other means within the scope of this disclosure. For example, the valve can be constructed such that, when a fluid of a predetermined temperature or higher enters thereinto, the shape memory alloy is heated by the fluid and exerts a shape recovering force.

Also, although in the embodiments shown herein the valve elements and the shape memory alloys are biased by springs, in the present invention the shape memory alloy can be biased by other means such as magnetic or gravitational force.

This invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A spool type valve comprising:
a casing means having a bore therewithin;
a spool fitted longitudinally movably within said bore;
a first inlet port formed through said casing means at a right angle with the longitudinal axis of said bore for connecting said bore with the exterior of said casing means therethrough;
a first outlet port formed through said casing means at the same place as said first inlet port with regard to the longitudinal direction of said bore for connecting said bore with the exterior of said casing means therethrough;
a second inlet port formed through said casing means at a right angle with the longitudinal axis of said bore and longitudinally spaced from said first inlet port for connecting said bore with the exterior of said casing means therethrough;
a second outlet port formed through said casing means at the same place as said second inlet port with regard to the longitudinal direction of said bore for connecting said bore with the exterior of said casing means therethrough;
a wire-shaped element having a first end and a second end, said wire-shaped element being constructed of shape memory alloy, said second end of said wire-shaped element being operatively connected to said valve element and said wire-shaped element being mechanically associated with said spool to as to undergo an elongation deformation from its original length when said spool is shifted from a first position where said spool closes said first inlet and outlet ports and opens said second inlet and outlet ports to a second position where said spool opens said first inlet and outlet ports and closes said second inlet and outlet ports;
biasing means biasing said spool toward said second position away from said first position;
an electric circuit including a first contact operatively connected to said first end of said wire-shaped element and a second contact operatively connected to said casing for effecting a closing of said contacts with each other while said spool is located at or between said first position and said second position and which are separated from each other when said valve element is moved beyond said first position away from said second position to a third position, said electric circuit passing a current through said shape memory alloy when said first and second contacts are in contact with each other.

2. The valve as set forth in claim 1, wherein said biasing means is a spring.

3. The valve as set forth in claim 1, wherein said shape memory alloy is formed of a Ti-Ni alloy.

4. A valve comprising:
a valve casing provided with a valve port which defines a valve seat;
a valve element guided within said casing for movement in directions for opening said valve port by disengaging said valve seat and closing said valve port by engaging said valve seat, said valve element being movable along a path which is axially aligned with said valve port;
biasing means for biasing said valve element in a direction to close said valve port;
a wire-shaped element having a first end and a second end, said wire-shaped element being constructed of shape memory alloy which reverses to an original length when heated to or above a critical temperature, said second end of said wire-shaped element being operatively connected to said valve element and said wire-shaped element being mechanically associated with said valve element so as to undergo an elongation deformation from its original length when said valve element is subjected to the biasing force of said biasing means at temperatures below the critical temperature;
an electric circuit for conducting an electric current through said wire-shaped element to thereby heat said wire-shaped element to produce a lengthwise contraction thereof from its elongated deformed state and an attendant movement of said valve element in a direction to open said valve port, said circuit including a first contact operatively connected to said first end of said wire-shaped element and a second contact operatively connected to said valve seat for engaging said valve element for effecting a closing of said circuit when said valve element engages said valve seat and an opening of said circuit when said wire-shaped element is heated to contract and disengages said valve element from said valve seat; and
means responsive to the opening and closing movement of said valve element for effecting a respective opening and closing of said contacts.

5. The valve as set forth in claim 4, wherein said valve casing is provided with a flow passage in communication with said valve port, and said wire-shaped element is disposed in said flow passage so as to be exposed in a cooling flow of fluid therethrough.

6. The valve as set forth in claim 4, wherein said valve element is formed with a conical tip which cooperates with said valve port to form a needle valve.

7. The valve as set forth in claim 4, wherein said biasing means is a spring.

8. The valve as set forth in claim 4, wherein said shape memory alloy is formed of a Ti-Ni alloy.

9. A valve comprising:
a valve casing provided with a valve port which defines a valve seat;
a valve element guided within said casing for movement in directions for opening said valve port by disengaging said valve seat and closing said valve port by engaging said valve seat, said valve element being movable along a path which is axially aligned with said valve port;
biasing means for biasing said valve element in a direction to close said valve port;
a wire-shaped element having a first end and a second end, said wire-shaped element being constructed of shape memory alloy which reverts to an original length when heated to or above a critical temperature, said second end of said wire-shaped element being operatively connected to said valve element and said wire-shaped element being mechanically associated with said valve element so as to undergo an elongation deformation from its original length when said valve element is subjected to the biasing force of said biasing means at temperature below the critical temperature;
an electric circuit for conducting an electric current through said wire-shaped element to thereby heat said wire-shaped element to produce a lengthwise contraction thereof from its elongated deformed state and an attendant movement of said valve element in a direction to open said valve port, said circuit including a first contact operatively connected to said first end of said wire-shaped element and a second contact operatively connected to a contact for engaging said valve element; and
means responsive to the opening and closing movement of said valve element for (1) effecting a closing of said first and second contacts when said valve element is located at or between a first position in which it closes said valve port and a second position in which it substantially fully opens said valve port and (2) effecting an opening of said contacts when said valve element moves from said second position to a third position which is farther from said valve port.

10. The valve as set forth in claim 9, wherein said valve casing is provided with a flow passage in communication with said valve port, and said wire-shaped element is disposed in said flow passage so as to be exposed to a cooling flow of fluid therethrough.

11. The valve as set forth in claim 9, wherein said biasing means is a spring.

12. The valve as set forth in claim 9, wherein said shape memory alloy is formed of a Ti-Ni alloy.

13. The valve as set forth in claim 9, further including means for separating said contact members and said shape memory alloy from a fluid passing through said valve.

14. A valve comprising:
a valve casing provided with a valve port which defines a valve seat;
a valve element guided within said casing for movement in directions for opening said valve port by disengaging said valve seat and closing said valve port by engaging said valve seat, said valve element being movable along a path which is axially aligned with said valve port;
biasing means for biasing said valve element in a direction to close said valve port;
a wire-shaped element having a first end and a second end, said wire-shaped element being constructed of shape memory alloy which reverts to an original length when heated to or above a critical temperature, said second end of said wire-shaped element being operatively connected to said valve element and said wire-shaped element being mechanically associated with said valve element so as to undergo an elongation deformation from its original length when said valve element is subjected to the biasing force of said biasing means at temperatures below the critical temperature;

an electric circuit for conducting an electric current through said wire-shaped element to thereby heat said wire-shaped element to produce a lengthwise contraction thereof from its elongated deformed state and an attendant movement of said valve element in a direction to open said valve port, said circuit including a first contact operatively connected to said first end of said wire-shaped element and a second contact operatively connected to a contact member for engaging said valve element for effecting a closing of said circuit when said valve element engages said contact member is heated to contract said disengage said valve element from said contact member; and means responsive to the opening and closing movement of said valve element for effecting a respective opening and closing of said contacts.

15. The valve as set forth in claim 14, wherein said valve casing is provided with a flow passage in communication with said valve port, and said wire-shaped element is disposed in said flow passage so as to be exposed to a cooling flow of fluid therethrough.

16. The valve as set forth in claim 14, wherein said biasing means is a spring.

17. The valve as set forth in claim 14, wherein said shape memory alloy is formed of a Ti-Ni alloy.

18. A valve comprising:

a valve casing provided with a valve port which defines a valve seat;

a valve element guided within said casing for movement in directions for opening said valve port by disengaging said valve seat and closing said valve port by engaging said valve seat, said valve element being movable along a path which is axially aligned with said valve port;

biasing means for biasing said valve element in a direction to close said valve port;

a wire-shaped element having a first end and a second end, said wire-shaped element being constructed of shape memory alloy which reverts to an original length when heated to or above a critical temperature, said second end of said wire-shaped element being operatively connected to said valve element and said wire-shaped element being mechanically associated with said valve element so as to undergo an elongation deformation from its original length when said valve element is subjected to the biasing force of said biasing means at temperatures below the critical temperature;

an electric circuit for conducting an electric current through said wire-shaped element to thereby heat said wire-shaped element to produce a lengthwise contraction thereof from its elongated deformed state and an attendant movement of said valve element in a direction to open said valve port, said circuit including a first contact operatively connected to a flange member connected to the valve element and operatively connected to said first end of said wire-shaped element and a second contact for engaging said flange member for effecting a closing of said circuit when said flange member engages said second contact and an opening of said circuit when said wire-shaped element is heated to contract and disengage said flange member from said second contact; and means responsive to the opening and closing movement of said valve element for effecting a respective opening and closing of said contacts.

19. The valve as set forth in claim 18, wherein said valve casing is provided with a flow passage in communication with said valve port, and said wire-shaped element is disposed in said flow passage so as to be exposed to a cooling flow of fluid therethrough.

20. The valve as set forth in claim 18, wherein said biasing means is a spring.

21. The valve as set forth in claim 18, wherein said shape memory alloy is formed of a Ti-Ni alloy.

* * * * *